United States Patent
Schwabe (12)

(10) Patent No.: US 6,636,032 B2
(45) Date of Patent: Oct. 21, 2003

(54) ANGULAR MEASUREMENT SYSTEM HAVING AN INTEGRATED FERRARIS SENSOR

(75) Inventor: Michael Schwabe, Rimsting (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/144,618

(22) Filed: May 13, 2002

(65) Prior Publication Data
US 2002/0180423 A1 Dec. 5, 2002

(30) Foreign Application Priority Data

May 12, 2001 (DE) .......................... 101 23 188

(51) Int. Cl.$^7$ ............................ G01P 3/49; G01P 15/08; G01B 7/30
(52) U.S. Cl. ............ 324/164; 324/207.22; 324/207.25; 73/514.16; 73/514.31
(58) Field of Search .................. 324/160, 162–166, 324/173, 174, 207.22, 207.25, 137; 73/514.02, 514.04, 514.14, 514.16, 514.31, 514.39, 519.01; 250/231.13–231.18; 341/13, 15

(56) References Cited

U.S. PATENT DOCUMENTS

| 4,507,607 A |   | 3/1985 | Caputo |
| 5,083,084 A | * | 1/1992 | Bauer et al. ........ 324/207.22 X |
| 5,939,879 A | * | 8/1999 | Wingate et al. ..... 324/207.22 X |

FOREIGN PATENT DOCUMENTS

| DE | 31 14 569 | 11/1982 |
| DE | 85 04 407 | 5/1985 |
| EP | 0 661 543 | 7/1995 |

\* cited by examiner

Primary Examiner—Gerard R. Strecker
(74) Attorney, Agent, or Firm—Kenyon & Kenyon

(57) ABSTRACT

Besides the measurement of angular position, an angular measurement system having an integrated Ferraris sensor also permits the direct measurement of angular acceleration or angular velocity. A graduated disk and an eddy-current disk are configured concentrically in one plane. Relief elements may ensure that temperature variations do not cause the connection between the graduated disk and the eddy-current disk to be lost.

16 Claims, 1 Drawing Sheet

ANGULAR MEASUREMENT SYSTEM HAVING AN INTEGRATED FERRARIS SENSOR

FIELD OF THE INVENTION

The present invention relates to an angular measurement system having an integrated Ferraris sensor.

BACKGROUND OF THE INVENTION

Angular measurement systems having an integrated Ferraris sensor unite the advantage of precise (angular) position measurement with the direct measurement of angular acceleration or angular velocity, which otherwise is only obtained from the positional signal in a time-differentiation operation. When a positional signal is differentiated, small interferences in the positional signal lead, however, to substantial changes in the differentiated signal, and thus in the calculated angular velocity and angular acceleration. This effect does not occur when a direct measurement of the angular acceleration is taken using a Ferraris sensor. Rather, the angular velocity can be obtained from an integration of the angular acceleration signal. Interferences in the angular acceleration signal are even smoothed in the process.

Ferraris sensors detect the magnitude of or the change in eddy currents, which arise due to the relative motion of magnetic fields and eddy current bodies.

European Published Patent Application No. 0 661 543 describes an angular measurement system, in which the angular acceleration is also measured. For this, two signalers are interconnected in a torsionally rigid manner, and a signal-detection unit is assigned to each signaler. A first of the two signalers is implemented by an optical or inductive graduation, which is scanned by a signal-detection unit having an optical or inductive scanning head. A second signaler is composed of an electrically conductive disk which is traversed in a perpendicular direction by a magnetic flux. This magnetic flux can be generated by suitable magnets. If the disk is moved in relation to the magnet, eddy currents form, which, in turn, produce a magnetic field. The change in this magnetic field is sensed by a signal-detection unit, so that the measured quantity ascertained in the signal-detection unit represents a measure for the angular acceleration. The two signalers are either each joined in the form of a separate disk, in a torsionally rigid manner, to a shared shaft, or the first signaler is mounted directly at the outer edge of the second signaler, thereby altogether enlarging the disk diameter.

In the foregoing, where two signalers are combined to form one disk, problems arise due to the different thermal expansion of the materials used when the angular measurement system is intended to be used at different temperatures. The connection of the two graduated disks or disk rings can loosen, for example, due to a greater expansion of the outer ring.

SUMMARY

It is therefore an object of the present invention to provide an angular measurement system having an integrated Ferraris sensor, which may ensure that the signalers used are held securely together, even given different operating temperatures.

To join the signalers, the present invention provides for relief elements, which also may ensure a secure cohesion of the signalers, even given a different thermal expansion. In this context, the materials employed for the signalers and the relief elements may be selected such that the strain between the signalers is held constant in response to varying temperatures.

Further advantages of the present invention and details pertaining thereto are derived from the following description of example embodiments, on the basis of the figures.

DETAILED DESCRIPTION

Figure 1:
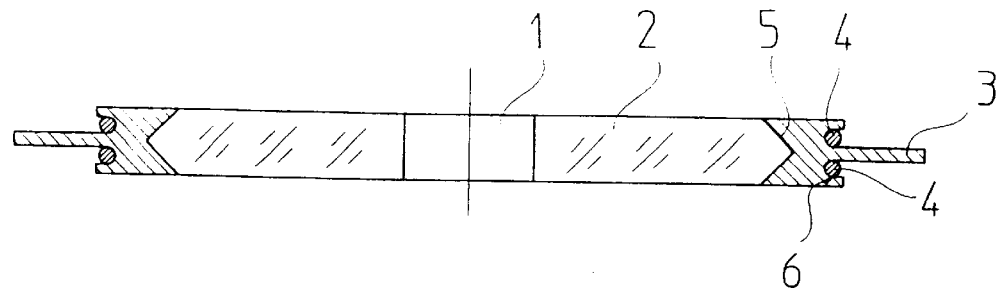
FIG. 1 is a side view of two signalers.

FIG. 1 illustrates a first signaler in the form of a graduated disk 2 and, mounted on its outer rim, a second signaler in the form of an eddy-current disk 3. Graduated disk 2 is joined in a torsionally rigid manner to a shaft 1, the angular position and angular acceleration of which are to be monitored. Graduated disk 2 may be made of glass, for example, having a graduation of chromium, or also of steel having an embossed graduation. By scanning graduated disk 2, one obtains a signal that is dependent upon the angular position. Graduated disks 2 may be implemented with graduations, for instance on an optical, magnetic, inductive, or capacitive basis, using appropriate scanning.

Likewise secured in a torsionally rigid manner to the outer periphery of graduated disk 2 is eddy-current disk 3. This may be shrink-fitted or bonded on, for example. Eddy-current disks 3 are made of non-magnetic, but electrically conductive material, such as copper, aluminum, chromium, silver, etc. On one of the two elements, i.e., graduated disk 2 and eddy-current disk 2, a first groove 5 may be provided, into which the other element engages, in order to thereby prevent a mutual slippage in the axial direction.

Since graduated disk 2 and eddy-current disk 3 have different coefficients of expansion, the connection between the two may be lost when, in response to warming, eddy-current disk 3 expands to a greater extent than graduated disk 2. To counteract this, in accordance with the present invention, at least one relief element 4 is provided, which presses eddy-current disk 3 against graduated disk 2. The expansion coefficient of relief element 4 may be selected such that it is less than that of eddy-current disk 3, e.g., even less than the expansion coefficient of eddy-current disk 3 and graduated disk 2.

Steel having the most widely varying expansion coefficients may be obtained. It may, therefore, be particularly suited, in the form of rings or wound wires, as a material for relief elements 4.

By choosing the expansion coefficients accordingly, the strain between graduated disk 2 and eddy-current disk 3 may remain constant for a selected temperature range. For this, the sum of the strain of eddy-current disk 3 and of relief element 4 produced during assembly may be constant within the selected temperature range.

A second groove 6 may be introduced on eddy-current disk 3 into which relief element 4 is inserted. This prevents relief element 4 from slipping in the axial direction.

Figure 2:
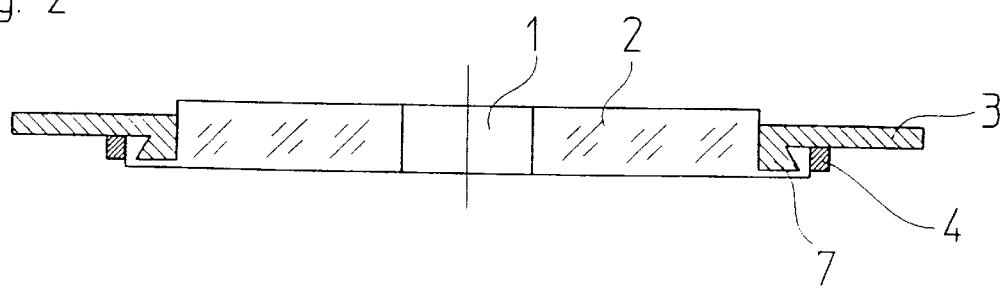
FIG. 2 illustrates an alternative embodiment of the signalers.

A somewhat different refinement of the connection between graduated disk 2 and eddy-current disk 3 is illustrated in FIG. 2. In this example embodiment, a third groove 7 on graduated disk 2 is illustrated, into which eddy-current disk 3 is inserted, thereby securing it against radial and axial slipping. This example illustrates the use of only one relief element 4. The individual elements 2,3,4 may be bonded to one another, for example, in order to achieve a greater stability.

Figure 3:
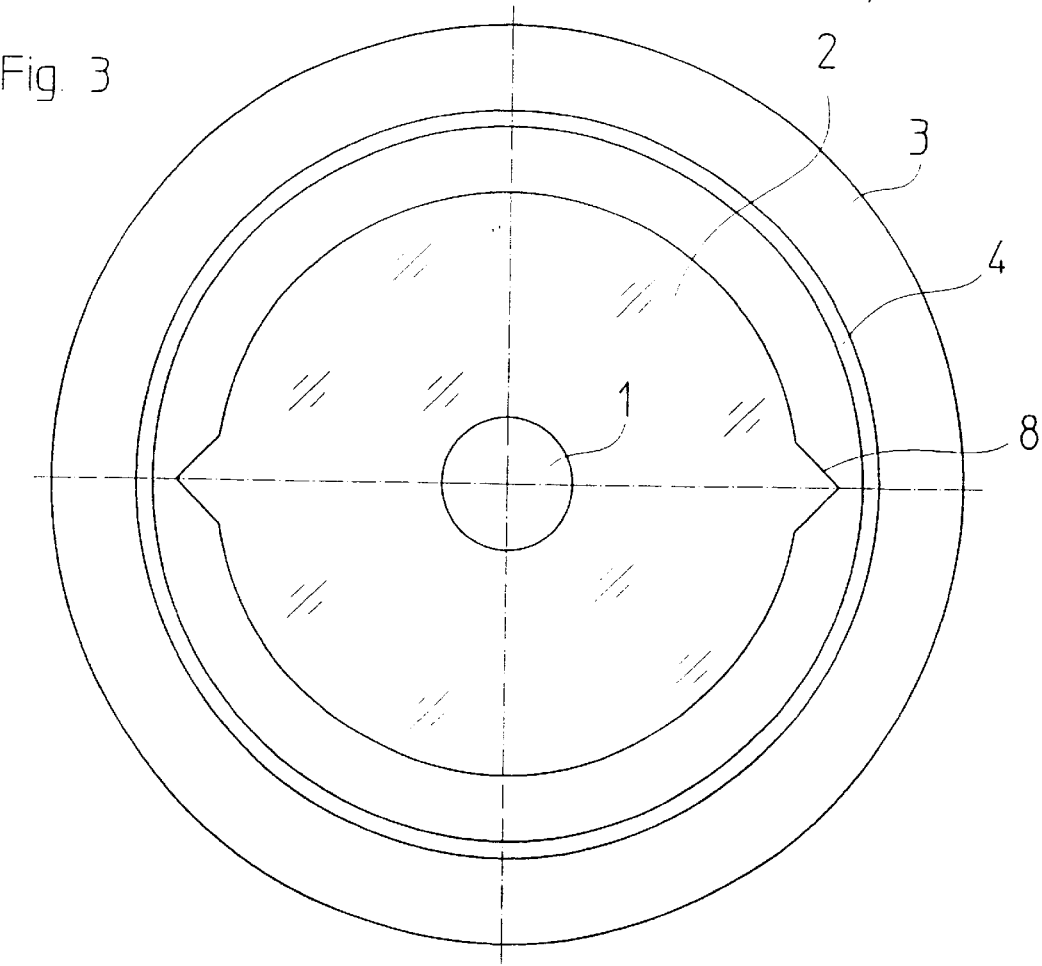
FIG. 3 is a plan view of two signalers.

FIG. 3 illustrates the described arrangement in accordance with FIG. 2 in a plan view. At eddy-current disk 3, a fourth groove 8 is illustrated, in which graduated disk 2 engages. In this manner, the two elements are also secured against tangential slippage (thus, against a relative rotation of the two signalers).

In addition to the strain caused by thermal expansion, a relief element 4 is also able to absorb stresses that occur in response to centrifugal forces produced by the rotation of shaft 1. For this, a relief element 4 may be provided around the outermost periphery of eddy-current disk 3.

Relief elements 4 may also be employed when the inner signaler is eddy-current disk 3 on the outer periphery of which graduated disk 2 is secured.

Relief elements 4 may even reduce or prevent the deformation or destruction of the outer signaler in question when the inner signaler expands more than the outer.

What is claimed is:

1. An angular measurement system having an integrated Ferraris sensor, comprising:
    a graduated disk;
    an eddy-current disk, the graduated disk and the eddy-current disk arranged concentrically in one plane; and
    at least one relief element configured to press the eddy-current disk and the graduated disk against one another.

2. The angular measurement system according to claim 1, further comprising a first groove arranged in one of the graduated disk and the eddy-current disk configured to prevent axial slippage of the eddy-current disk and of the graduated disk.

3. The angular measurement system according to claim 1, further comprising a groove at the eddy-current disk configured to secure the relief element to prevent the relief element from axial slippage.

4. The angular measurement system according to claim 1, wherein the graduated disk is made of glass.

5. The angular measurement system according to claim 1, wherein the graduated disk is made of steel.

6. The angular measurement system according to claim 1, wherein the eddy-current disk is made from one of copper and aluminum.

7. The angular measurement system according to claim 1, wherein the relief element is made of steel.

8. The angular measurement system according to claim 1, wherein an expansion coefficient of the relief element is less than an expansion coefficient of the eddy-current disk.

9. The angular measurement system according to claim 1, wherein an expansion coefficient of the relief element is less than an expansion coefficient of the eddy-current disk and less than the expansion coefficient of the graduated disk.

10. The angular measurement system according to claim 1, further comprising a groove arranged in a first one of the graduated disk and the eddy-current disk configured to prevent axial slippage of the eddy-current disk and of the graduated disk, the groove adapted to engage a second one of the eddy-current disk and the graduated disk.

11. The angular measurement system according to claim 3, wherein the groove is configured to receive the relief element.

12. The angular measurement system according to claim 1, further comprising:
    a first groove arranged in a first one of the eddy-current disk and the graduated disk and configured to prevent axial slippage of the eddy-current disk and of the graduated disk; and
    a second groove at the eddy-current disk configured to secure the relief element to prevent the relief element from axial slippage.

13. The angular measurement system according to claim 12, wherein the first groove is adapted to engage a second one of the eddy-current disk and the graduated disk.

14. The angular measurement system according to claim 12, wherein the second groove is configured to receive the relief element.

15. The angular measurement system according to claim 13, wherein the second groove is configured to receive the relief element.

16. An angular measurement system having an integrated Ferraris sensor, comprising:
    a graduated disk;
    an eddy-current disk, the graduated disk and the eddy-current disk arranged concentrically in one plane; and
    at least one relief element means for pressing the eddy-current disk and the graduated disk against one another.

* * * * *